Dec. 8, 1970     C. R. SCHOFIELD     3,545,302

VEHICLE TRANSMISSION SYSTEMS

Filed Oct. 10, 1968     9 Sheets-Sheet 1

United States Patent Office 3,545,302
Patented Dec. 8, 1970

3,545,302
VEHICLE TRANSMISSION SYSTEMS
Clifford Raymond Schofield, Bradford, England, assignor to The English Electric Company Limited, London, England, a British company
Filed Oct. 10, 1968, Ser. No. 766,577
Claims priority, application Great Britain, Oct. 10, 1967, 46,319/67
Int. Cl. F16h *37/06;* B60k *19/00*
U.S. Cl. 74—691
5 Claims

ABSTRACT OF THE DISCLOSURE

This invention is concerned with a variable-speed transmission system, especially for vehicles, including a steplessly variable unit and a planetary gear train. By locking one or other of two parts of the planetary gear train, two regimes of operation can be achieved. In one regime, which is the low gear regime for vehicles, and can also include a reverse drive, the planetary gear train acts as a sort of differential gear. In the other regime this differential effect is absent and the variable unit drives the output direct. The specification is particularly concerned with arrangements for changing over automatically from one regime of operation to the other.

---

This invention relates to variable speed transmission systems, particularly for vehicles. In particular this invention is concerned with improvements in a form of transmission system described basically and in improved forms in British Pat. No. 1,078,791.

The basic transmission over which the present invention is an improvement may be defined as comprising a variable ratio transmission unit (which will be called a "variable unit") of which the drive ratio is steplessly variable and which is driven by the transmission input member and is arranged to drive the transmission output member either via a planetary gear train or the equivalent, in what will be termed the "first regime," or directly in what will be termed the "second regime."

In this context, as in Pat. No. 1,078,791, we will refere to the drive ratio of the transmission system as being high when the ratio of output speed to input speed is high; conversely a low ratio is one in which the ratio of output speed to input speed is low.

In order to cover the transmission ratio range of the system as a whole, from one end of the range to the other, the drive ratio of the variable unit is changed firstly in one sense to substantially its limit in that particular sense, this being one regime of operation of the system, and is changed in the opposite sense during the other regime of operation. In other words, no abrupt change in the drive ratio of the variable unit is needed when changing from one regime of operation to the other.

This form of transmission system is referred to in Pat. No. 1,078,791 as a synchronous form, as opposed to the alternative asynchronous form also described in Pat. No. 1,078,791. The present invention is particularly concerned with such a synchronous form and the above synchronous form of transmission will be referred to as a "transmission system of the kind described."

A main feature of this invention is concerned with an arrangement for changing over automatically from one regime to the other. As mentioned in Pat. No. 1,078,-791, the planetary gear train can be arranged to include two rotary parts each of which is locked against rotation by a brake to produce one regime of operation of the system, and is free to rotate during the other regime of operation. In other words, one of the rotary parts is locked to produce one regime of operation, and the other is locked to produce the other regime of operation. The planetary gear train can be such that each rotary part, when it is rotating, slows down to a stop as the transmission ratio of the system approaches and then reaches the point beyond which further changes in the same sense require the other regime of operation; if the regime of operation is not changed then the rotary part begins to rotate in the opposite direction. Regime changing according to this invention is initiated by means of a changeover device in response to this contra-rotation of the rotary part.

According to this invention, the normal directions of rotation of the two regime-controlling rotary parts of the planetary gear train are opposite. Each of these rotary parts cooperates with a regime changeover device which it can drive during contra-rotation but not during rotation in its normal direction, and the two regime changeover devices are connected to a regime control member which operates a brake to lock the appropriate rotary part of the planetary gear train (depending upon which direction the regime is being changed) to bring about the necessary regime change automatically when that rotary part begins its contra-rotation and accordingly drives the cooperating changeover device.

A preferred form of changeover device including a toggle mechanism will be described with reference to the accompanying drawings.

In the preferred arrangement for use as a vehicle transmission, the low ratios for forward drive are provided by the first regime, and the system can provide a zero output speed at one point in the first regime. The variable unit drive ratio can be changed in either sense from this zero output point. A change in one sense is towards the limit at which the change is reversed for the second regime of operation, and a change in the other sense produces a progressively increasing output speed in the reverse direction and is therefore used for driving the vehicle in reverse. Forward driving of the vehicle from start makes use firstly of the first regime, starting from the zero output point of the variable unit (i.e., the point in the variable unit range at which the system as a whole has a zero output), and then after the vehicle has accelerated with a progressively increasing transmission ratio, the variable unit eventually reaches the limiting ratio position in which the second regime of operation can be started to increase the overall transmission ratio still further (that is unless, for example, the vehicle is on a hill and requires a continuously low transmission ratio). This process reverses as the vehicle slows down and finally stops.

Examples of transmission systems according to this invention as applied to a vehicle drive will now be described with reference to the accompanying drawings.

Figure 1:
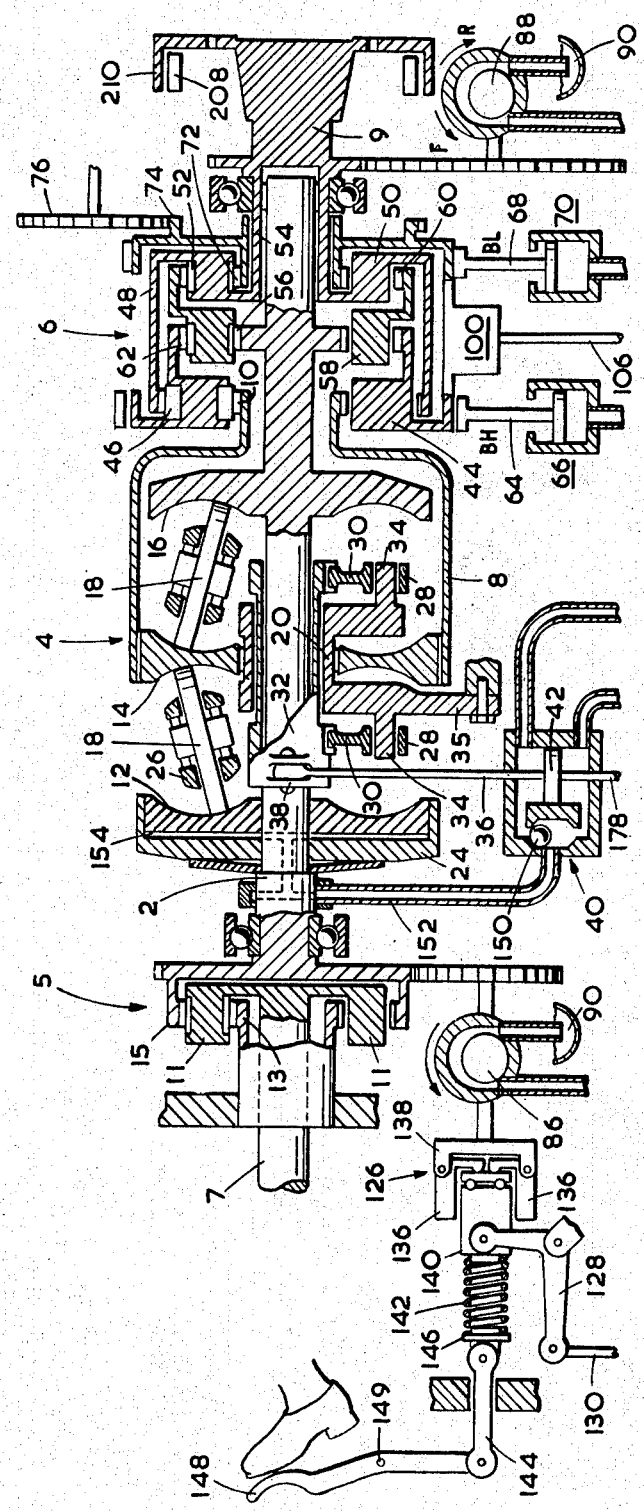
FIG. 1 is a general diagrammatic view of the main mechanical parts of the system.

As shown in FIG. 1, the transmission system has an input shaft 2 which serves as the input to a variable ratio frictional drive unit 4 and also extends from the far end of the variable unit 4 and into a planetary gear train 6. The shaft 2 is driven by an engine shaft 7 via an epicyclic gear 5 having a 3:2 step-up drive ratio; the gear 5 comprises planetary gears 11 which are carried by the shaft 7 and which mesh internally and externally respectively with a stationary gear member 13 and an annular gear 15 connected to the shaft 2. The output of the variable unit 4 is transmitted through a drum member 8 to a gear 10 forming part of the planetary gear train 6.

The variable unit is in the form of a frictional roller drive gear consisting of three toroidal discs 12, 14 and 16 between which two sets of rollers 18 are in frictional rolling engagement. The middle toroidal disc 14 is connected to the drum 8 (with freedom to move slightly axially) and is mounted on roller bearings around a stationary sleeve member 20. The outer disc 16 is secured to the central shaft 2, while the disc 12 has a spline connection with the shaft 2 and is urged axially towards the disc 16 by oil pressure acting in a cylinder defined by a cylindrical wall on a stationary member 24. The oil pressure in the cylinder produces the necessary reaction between the rollers and the toroidal discs by which the rollers can transmit a frictional drive from the outer discs 12 and 16 to the center disc 14.

The drive ratio of the variable unit 4 is varied by altering the ratio angle of the rollers, that is to say the angle about a tangential tilt axis which determines the distances from the gear axis at which the rollers engage the toroidal discs. The rollers are shown at a ratio angle at which they engage the middle disc 14 at a greater radius than the outer discs, so that the variable unit transmits a stepped down drive.

The rollers are mounted in roller carriages 26 which are pivotally mounted in rockers 28 having radially inwardly extending arms 30 pivoted to a control sleeve 32. These rockers are pivoted by pins 34 to stationary spider arms 35 extending from the sleeve member 20. By adjusting the angular position of the control sleeve 32, the angular positions of the rockers about their pins 34 can be adjusted, and this controls the tangential positions of the roller carriages and consequently the ratio angle of the rollers. The angular position of the control sleeve 32 about the gear axis is controlled by a rod 36 pivoted to a lug 38 on the control sleeve. This form of control is described, for example, in our British Patent No. 1,133,265. It should be understood that the control arrangement for the sleeve 32 is shown purely diagrammatically in the accompanying drawings and that in practice it is necessary to provide two lugs 38 on opposite sides of the sleeve 32, with two parallel rods connected respectively to the two lugs so that the forces on the sleeve 32 are balanced. The rod 36 is shown connected to a piston 42. In practice there may be two rods which are both controlled by the same piston by being connected to opposite sides of a bellcrank which rocks under the control of a further link connected to the piston as described in our Patent No. 1,133,266; alternatively, the two rods pivoted to the lugs on the sleeve may form the piston rods of two separate pistons 42 both connected appropriately to the hydraulic control circuit so as to be urged in opposite directions.

The piston 42 forms part of a ratio jack 40. The function of the ratio jack will be described later on.

The planetary gear train, which is shown diagrammatically, includes an annular member 44 which carries a number of circumferentially spaced planetary gears 46 (for example three) meshing with the gear member 10. A tubular member 48 is formed at one end with internal teeth meshing with the planetary gears 46, and at the other end it is secured to a member 50 which carries a further set of planetary gears 52. The member 50 is in turn connected via a sleeve 54 to the output shaft 9 of the system. The planetary gear train is completed by a third set of planetary gears 56 which are carried by a member 58 which also carries an annular gear 60 meshing with the planetary gears 52. The planetary gears 56 mesh with a further annular gear 62 connected to the member 44 carrying the planetary gears 46.

A rotary part in the form of a brake drum BH is connected to the member 44 and has a cooperating braking device 64 controlled by a hydraulic jack 66. This brake is operated to lock the drum BH when the transmission is required to operate in the second regime, that is to say the regime in which the transmission provides the higher range of overall gear ratios. The brake drum BH is freed when the transmission is operating in the first regime, during which stage a second rotary part in the form of a brake drum BL is held locked by means of a cooperating braking device 68 operated by a hydraulic jack 70. The brake drum BL is formed around a sleeve member including a gear 72 meshing internally with the planetary gears 52. This sleeve member also carries a further gear 74 meshing with a gear wheel 76 from which a power take-off can be obtained when the vehicle is at rest.

It should be noted that alternative planetary gear arrangements can be used, in place of that shown, to produce the same results.

For convenience the second regime of operation, as it provides the higher gear ratios, will be referred to as the "high regime," and the first regime will be referred to as the "low regime."

It will be seen that when the brake drum BL is locked, while the brake drum BH is allowed to rotate, the output shaft 9 will rotate at a speed which depends firstly upon the speed of the input shaft 2 and secondly upon the speed of the variable unit output drum 8. The input shaft 2 rotates always in a clockwise direction (as viewed from the engine end, i.e., the left-hand end), and the variable unit output drum 8 rotates always in an anticlockwise direction. The direction of rotation of the transmission output shaft 9, however, depends upon the gear ratio of the variable unit during low regime operation. This is shown particularly by FIG. 8. In this graph the curve 78 represents the output speed of the variable unit (in relation to the speed of the input shaft 2) and shows how this affects the overall gear ratio of the transmission system as plotted against the horizontal axis. It will be seen that the overall ratio with this particular arrangement is zero when the variable unit output is at about —2.4 (i.e., 2.4 times the speed of the input shaft). When the variable unit output falls below 2.4 in the low regime, the overall transmission ratio is positive (i.e., the vehicle is driven forwards), while variable unit outputs above 2.4 in the low regime produce a negative overall transmission ratio (i.e., the vehicle is driven in reverse). As shown also in this graph, the lowest variable unit output is about .75. When the variable unit reaches this point, the transmission system is changed into the high regime of operation, and increases in the variable unit output from this point, moving to the right along the curve 78, increase the overall transmission ratio.

FORWARD DRIVING—LOW REGIME

Figure 2:
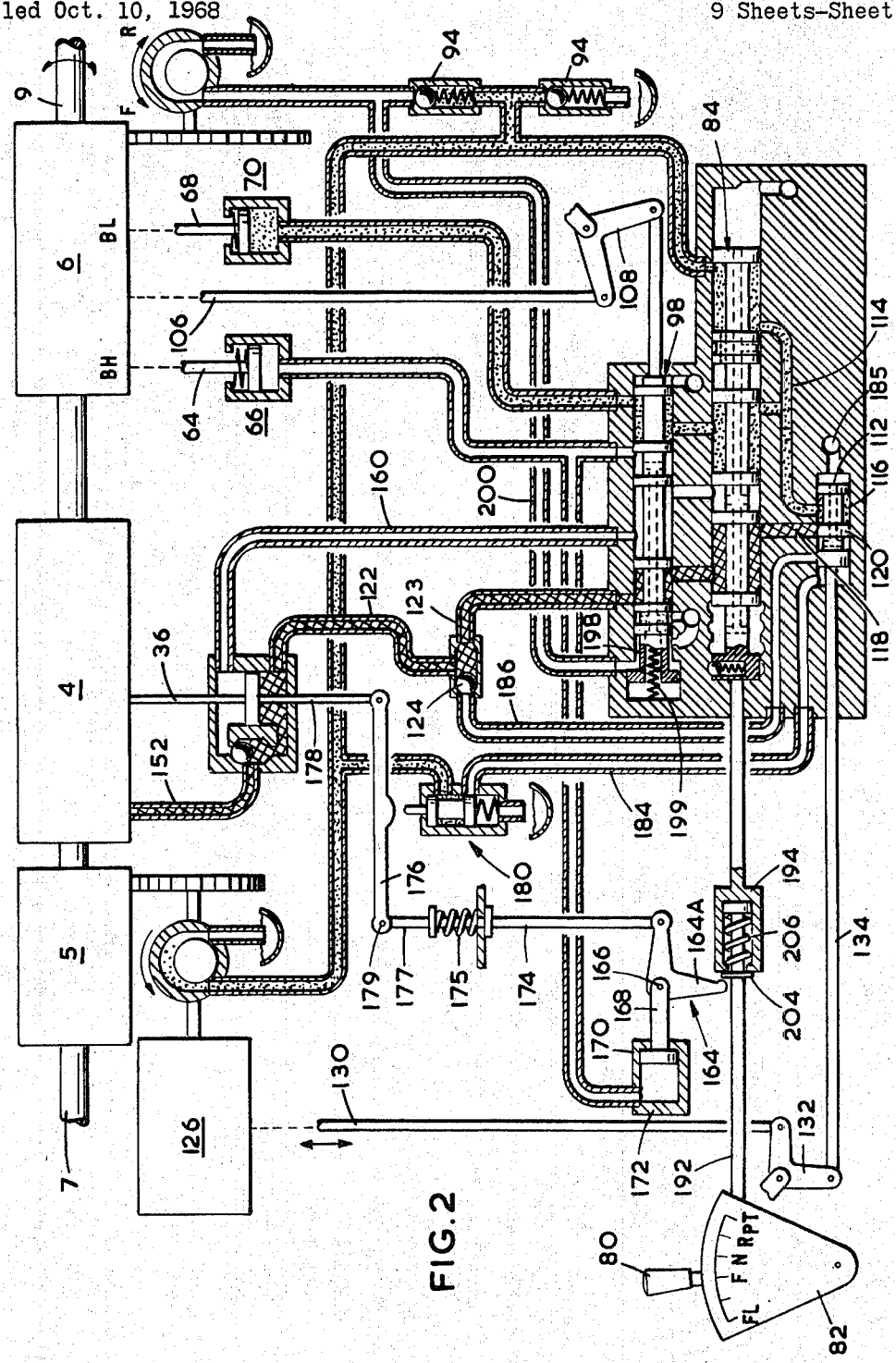
FIG. 2 is a diagrammatic view of the control circuit of the transmission while operating in the low regime and driving the vehicle forwards.

FIG. 2 shows the control system in the state in which it propels the vehicle forwards in the low regime. For this purpose a selector lever 80 is set in the position shown, i.e., at the letter F on a dial 82. This determines the axial position of a general control valve 84. By virtue of the position of the valve 84, servo oil is supplied to the jack 70 controlling the braking device 68, so as to operate the braking device 68 and lock the drum BL. Accordingly the system operates in the low regime.

Servo oil (shown throughout the drawings with a dotted shading) is delivered primarily by a pump 86 (see FIG. 1) driven from the input shaft 2, but is also delivered for some purposes by a pump 88 driven from the output shaft 9. Oil in each case is drawn from a reservoir 90. There are two safety valves 94 (see FIG. 2).

Throughout FIGS. 2 to 6, pipes and chambers containing oil at servo pressure are shown with a dotted shading, while pipes and chambers shown without any shading are at drain pressure. Pipes and chambers shown with a criss-cross shading are at a control pressure which determines the position of the ratio jack piston 42 and accordingly the transmission ratio of the variable unit 4.

Figure 7:
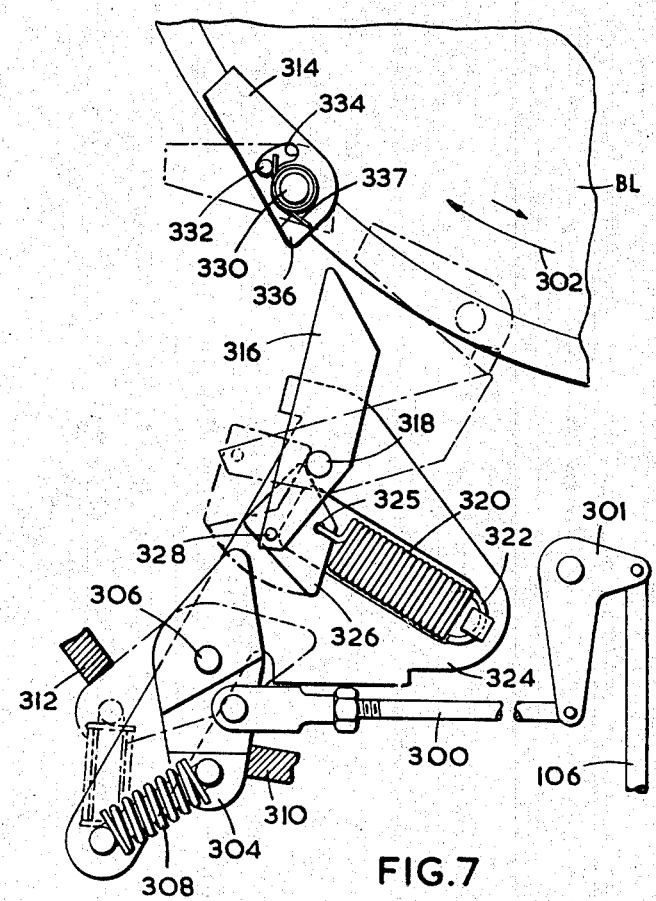
FIG. 7 shows a preferred changeover device for controlling the regime of operation.
Figure 8:
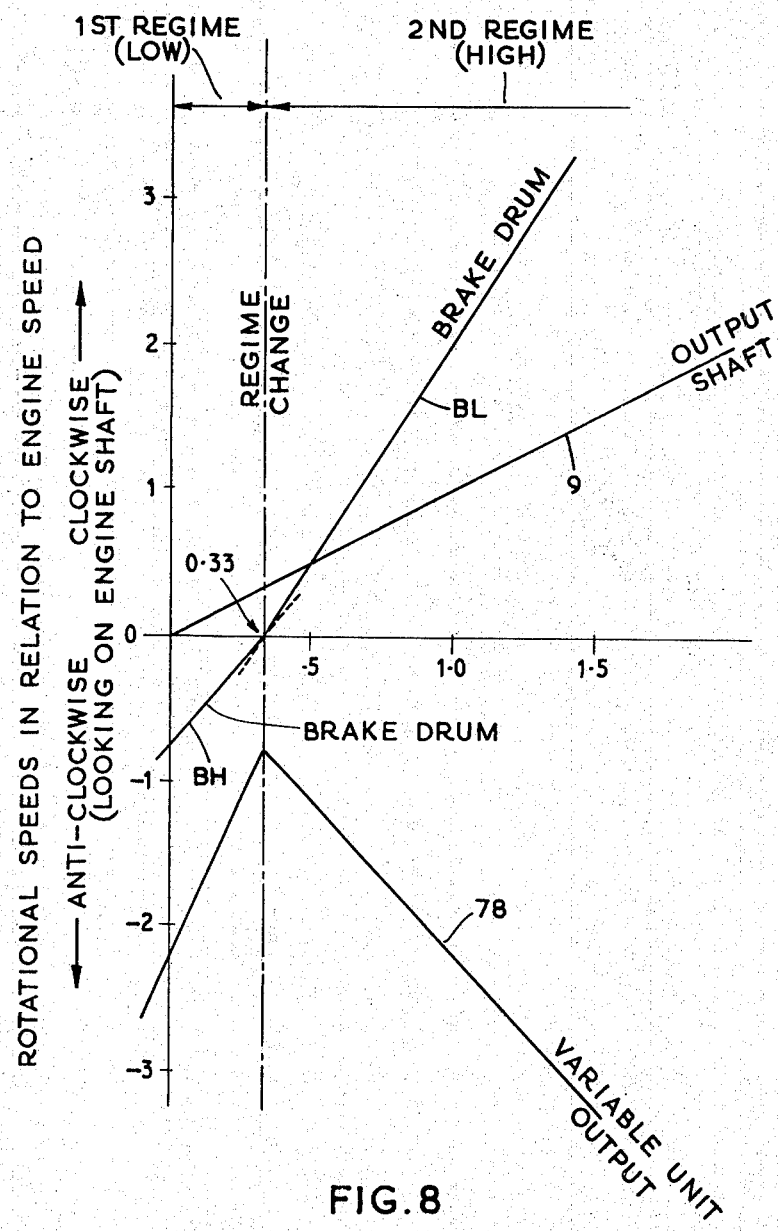
FIG. 8 is a graph showing various relative speeds plotted against the transmission ratio of the system as a whole.

As indicated in FIGS. 1 and 2, a regime control valve 98 is controlled by a changeover mechanism 100 driving a link 106 connected to the regime control valve via a bellcrank 108. The changeover mechanism includes two oppositely acting changeover devices (of which one is shown in FIG. 7) cooperating respectively with the two drums BH and BL. During low regime forward driving the drum BH rotates in an anticlockwise direction (as shown in FIG. 8) and allows the rod 106 to remain in the position shown in FIG. 2 so as to keep the regime change valve in the low regime position.

As the transmission ratio of the system increases, the speed of rotation of the drum BH decreases (see FIG. 8), and the gear ratios of the planetary gear 6 are so chosen that the speed of the drum BH becomes zero at the point when the variable unit reaches the desired limit of its ratio change in the downward direction. At this point the system is arranged to change to the high regime of operation. This occurs automatically because after reaching the point of zero rotation, the brake drum BH begins to rotate in the opposite direction (i.e., clockwise) and thus drives the cooperating changeover device so as to move the rod 106 upwards and thus move the regime control valve into the position shown in FIG. 3, which is the high regime position. When this happens, servo pressure is cut off from the jack 70 controlling the brake drum BL and is delivered instead to the jack 66 so as to lock the brake drum BH. The system then operates in the high regime. The operation of the changeover devices will be described further on with reference to FIG. 7.

As shown in FIG. 2, servo oil is directed from the general control valve 84 to a governor valve 112 via a passageway 114. Servo oil enters an annular chamber 116 in the governor valve and from there flows into a passageway 118 past a land portion 120 on the valve which produces a pressure drop, so that the pressure in the passageway 118, which is the control pressure for the ratio jack, is lower than servo pressure. From the passageway 118, control oil passes to the lower end of the ratio jack via pipes 123 and 122. A double-acting ball valve 124 is held by the control pressure against its left-hand seat.

Figure 9:
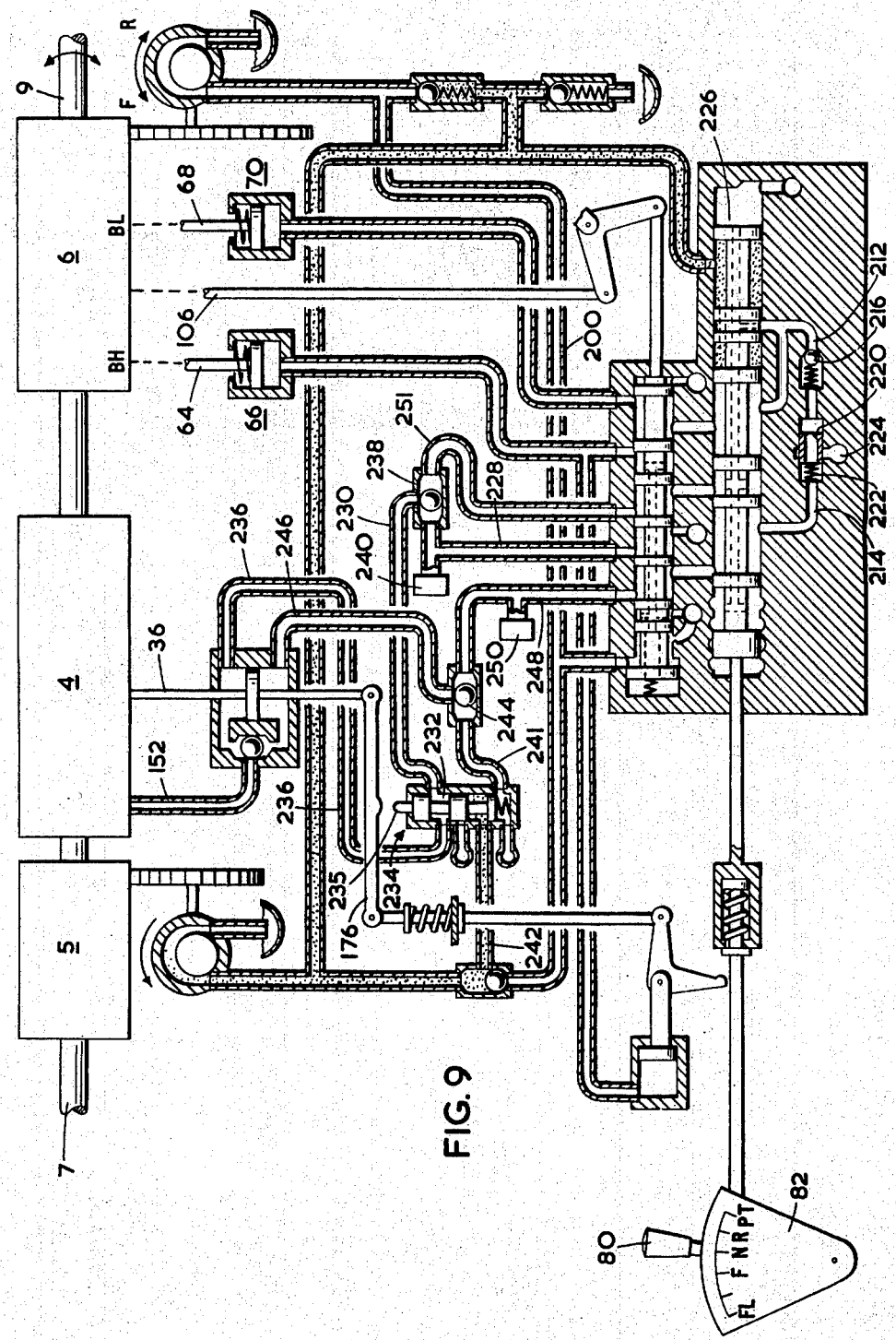
FIG. 9 shows part of a modified control circuit.

The control pressure at the lower end of the ratio jack provides the necessary resistance to the torque reaction from the variable unit. That is to say when a drive is being transmitted by the variable unit, the control sleeve 32 tends to be rotated in a clockwise direction by the torque reaction of the rollers. The force on the control sleeve is resisted by the control pressure in the ratio jack. As the control pressure increases, which is by virtue of movement of the governor valve 112 to the left (i.e., increasing the area for flow from the annular space 116 to the passageway 118 so as to reduce the pressure drop) the ratio jack piston 42 moves upwards and thus moves the roller carriages tangentially so as to decrease the drive ratio of the variable unit. As the drive ratio of the variable unit decreases, so the drive ratio of the system as a whole increases, as shown in FIG. 9 (note that this applies of course only to the low regime of operation).

The governor valve 112 is controlled by a governor 126 (see FIG. 1) via a bellcrank 128, a link 130, a further bellcrank 132, and a valve rod 134. The governor is in a conventional form and includes weights 136 which are pivoted to a body 138 and tend to force to the left a block 140 by virtue of the centrifugal force of the weights. The force to the left on the block 140 is resisted by a spring 142 extending between the block and a collar 146 on an axially slidable rod 144 which is controlled by an accelerator pedal 148 pivoted on a pin 149. The body 138 of the governor is driven from the input shaft 2, so that the block 140 tends to move further to the left as the engine speed increases. The actual movement to the left does not depend only upon the engine speed but also upon the position of the accelerator pedal. An increased displacement of the pedal 148 (i.e., in an anticlockwise direction) moves the collar 146 to the right and therefore increases the resistance imposed on the governor block 140 by the spring 142. In practice what this means is that the more the accelerator pedal is pressed, the higher must be the engine speed in order to achieve a given amount of movement of the governor valve such as to increase the control pressure. The rate of the spring 142 may be so designed as to provide a substantially constant torque load on the vehicle engine or a torque varying with speed to suit the engine characteristics and make most efficient use of the fuel consumed by the engine in different driving conditions; it may, for example be of a suitable conical shape.

Control pressure from the pipe 122 is also fed via a double acting ball valve 150 to a pipe 152 from which the oil enters the cylinder space 154 between the toroidal disc 12 and the stationary member 24 to provide the necessary axial loading by which the driving reaction between the rollers and the toroidal discs is generated. By this arrangement the axial loading force is maintained at a constant relationship with the torque reaction on the control sleeve 32, so that the axial loading is at all times neither unnecessarily great nor too small for the torque being transmitted by the variable unit.

FORWARD DRIVING—HIGH REGIME

Figure 3:
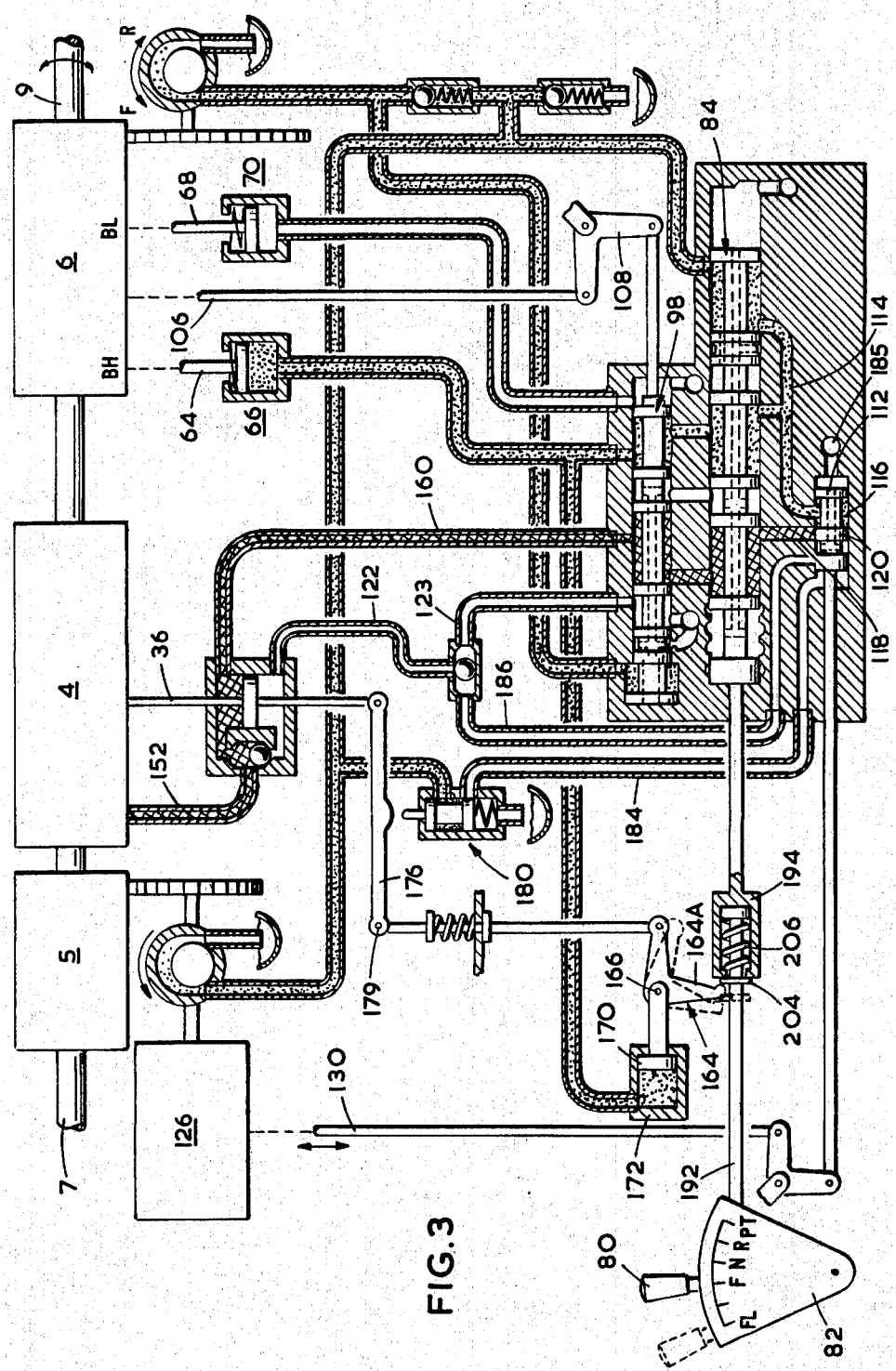
FIG. 3 shows the hydraulic control circuit in operation when the system is arranged for forward propulsion in the high regime.

As already mentioned, when the transmission ratio of the system reaches the appropriate point, the changeover mechanism moves under the influence of the brake drum BH (i.e., when this drum begins its contra-rotation) so as to move the regime control valve 98 into the high regime position in which the brake drum BH is arrested while the drum BL is free to rotate. The flow network at this stage is shown in FIG. 3. It should be noted in particular that the control pressure is now directed by the regime control valve to a pipe 160 instead of to the pipe 123 as in low regime operation. This means that the ratio jack is urged by control oil in the opposite direction, which is appropriate as the torque reaction on the control sleeve 32 is reversed. Again an increase in engine speed moving the governor valve 112 further to the right results in an increase in the control pressure, but this time an increase in control pressure has the reverse effect on the variable unit; that is to say, an increase in control pressure increases the drive ratio of the variable unit. In this regime, as opposed to the low regime, an increase in the drive ratio of the variable unit produces an increase in the overall transmission ratio of the system, as shown in FIG. 8.

As shown also in FIG. 7, during high regime operation the brake drum BL rotates in a clockwise direction (i.e., in the opposite direction to the normal rotation of the drum BH during low regime operation). The changeover device cooperating with the drum BL is such as to displace the regime control valve 98 only when the rotation of the drum BL is anticlockwise.

As the transmission ratio of the system decreases, so the speed of clockwise rotation of the drum BL decreases and the speed becomes zero at the changeover point, that is to say at the point at which the transmission is required to change to the low regime. A slight further reduction in the transmission ratio beyond the changeover point produces the necessary reverse rotation of the drum BL (i.e., anticlockwise rotation) which results in the drum BL driving its cooperating changeover device in a direction such as to carry the regime control valve back to the low regime position, whereupon the supply of servo oil to the jack 66 is discontinued, and servo oil is delivered instead to the jack 70 so as to lock the brake drum BL. During further decreases in the transmission ratio of the system, the drum BH rotates in an anticlockwise direction and thus allows the regime control valve to remain in the low regime position.

REVERSE

Figure 4:
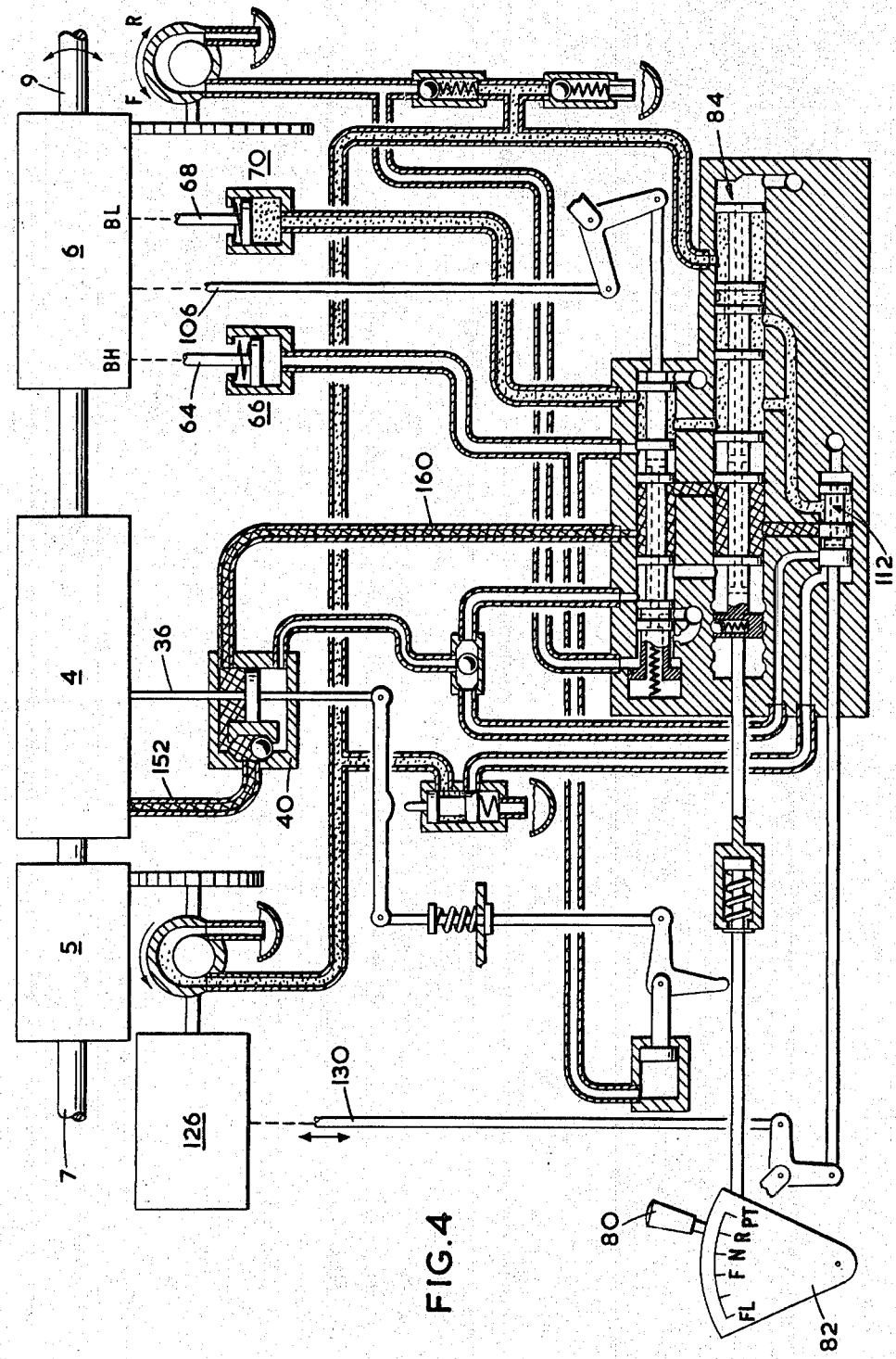
FIG. 4 shows the control circuit when arranged for reverse propulsion.

It will be seen that the selector lever 80 remains in the same F position for both low regime and high regime operation for forward propulsion of the vehicle. In order to drive the vehicle in reverse, the operator must move the selector lever 80 to the position shown in FIG. 4, that is to say against the letter R on the dial 82. As shown in FIG. 4, during reverse movement the brake drum BL remains locked and the regime control valve remains in the low regime position. The general control valve 84 in this case directs control pressure to the upper end of the ratio jack 40 through the pipe 160 as the torque reaction on the roller carriages tends to move the ratio jack piston upwards. As before, the accelerator pedal position and engine speed determine the position of the governor valve 112, and this in turn determines the pressure of control oil delivered to the ratio jack. Again, the higher the engine speed, the higher will be the control pressure. As opposed to the case of low-regime forward propulsion, an increase in control pressure results in an increase in the variable unit output speed, which in this case results in an increase in the reverse driving speed of the output shaft 9, as shown in FIG. 8.

NEUTRAL

Figure 5:
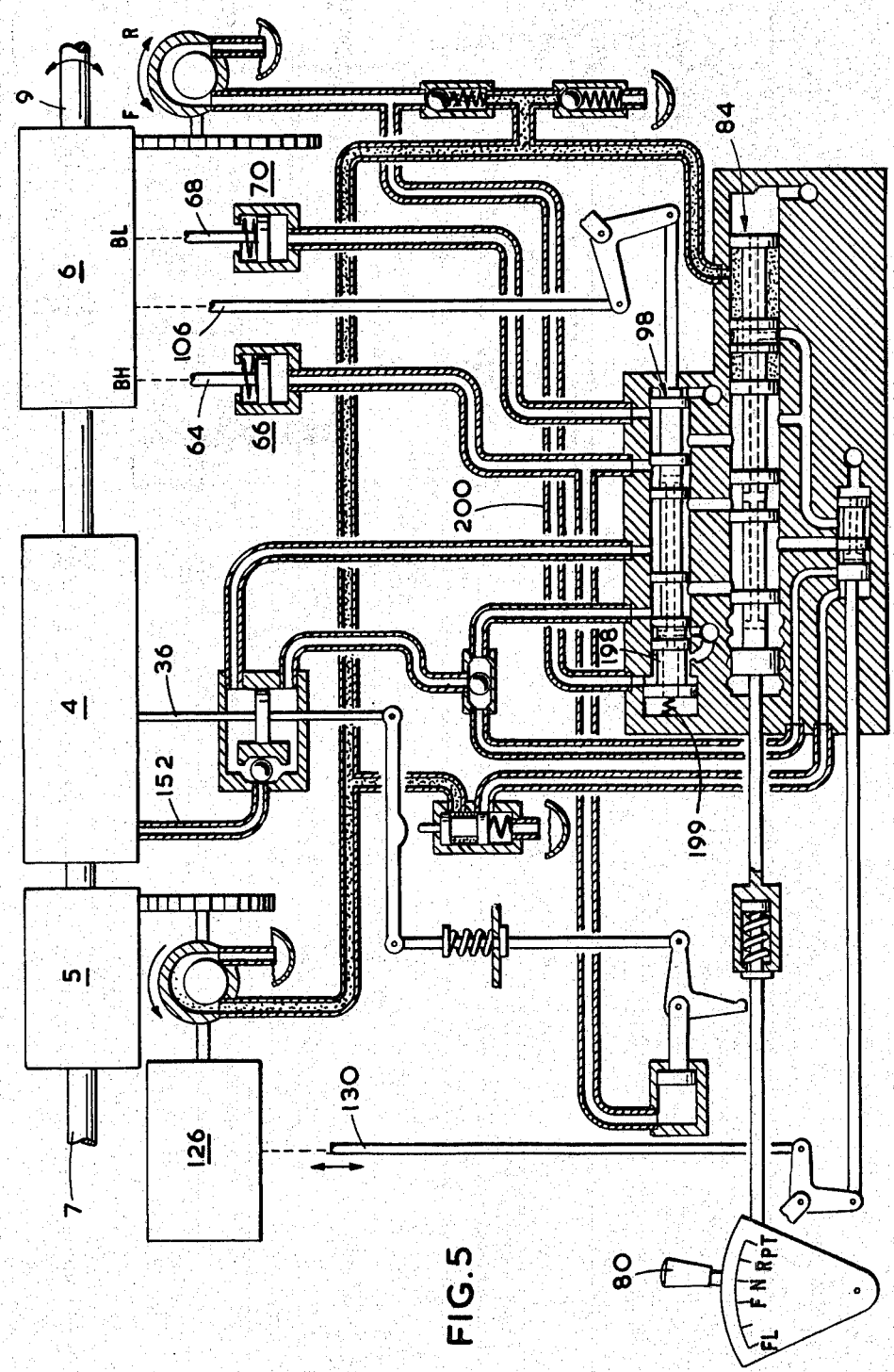
FIG. 5 shows the control system in "neutral" (i.e., when the engine can run while the vehicle remains stationary)

FIG. 5 shows the control circuit in a state equivalent to the neutral position of a conventional vehicle gear box. For this purpose the selector lever 80 is moved to the N position, in which position the general control valve 84 cuts off any supply of servo oil to the ratio jack. Moreover neither of the jacks 66 and 70 controlling the brake drums BH and BL is supplied with servo oil. Accordingly no power can be transmitted by the planetary gear train 6, and the engine can idle in the usual way. The ratio jack, being free from control oil, allows the variable unit to move to and remain in the position of zero overall transmission output. The regime control valve is held in the low regime position by a piston 198 urged by a spring 199 and bearing on the left-hand end of the valve, so that the valve is held ready for low regime operation which commences as soon as the selector lever 80 is moved to the F position. During high regime operation, servo oil is directed to the piston 198 through a pipe 200 so as to move the piston to the left against the action of its spring and thus relieve the changeover mechanism of the need to act against the resistance of the spring 199.

RATIO LIMITING OF THE VARIABLE UNIT

It is desirable to limit the amount by which the variable unit ratio can change in the direction away from the regime change point. Going towards the regime change point, the ratio cannot change excessively, because the regime changing procedure automatically limits the ratio change. In the other direction, however, it is desirable to protect the variable unit to ensure that the rollers cannot run off the toroidal surfaces of the torus discs. A ratio limiting valve 180 provides this protection. When the ratio jack piston moves downwards to the desired limit, a lever 176 swings about its left end pivot 179 (see FIG. 2 or 3) and depresses the valve member of the ratio limiting valve 180. Consequently oil at a pressure approaching that of the servo oil is fed to the governor valve via the pipe 184 and displaces the governor valve to the right. This permits oil to flow to the lower end of the ratio jack via the pipes 186 and 122, while the passageway 118 is isolated from the annular chamber 116 so as to discontinue the supply of servo oil to the pipe 160. At the same time the passageway 118 is made to communicate with a passageway 185, via a hole passing through the valve member (shown in dotted outline), and this leads to drain. As a result the ratio jack piston is moved upwards away from the limiting position. This ratio limiting action occurs both at the extreme high regime position (i.e., at the right-hand end of the curve shown in FIG. 8) and also at the extreme reverse driving position shown at the left-hand end of the curve in FIG. 8. It does not come into operation during low-regime forward propulsion.

The ratio limiting valve 180 also enables the operator to set the variable unit at a deliberately low ratio if desired, for example in order to achieve engine braking of the vehicle. For this purpose the selector lever 80 is moved to the left from the F position as shown in FIG. 3. As a result a flange 204 on the connecting rod 192, which is normally held by a spring 206 against the end of the connector piece 194, is pulled away from the end of the piece 194 (as shown in dotted outline) and engages an arm 164A of a bellcrank 164 so as to swing the bellcrank about its pivot 166 in a clockwise direction. This carries downwards the left-hand end of the lever 176, by pulling down a lever 174 against the action of the return spring 175, and as a result the ratio limiting valve is opened by the lever 176 at a lower variable-unit ratio. In other words, moving the selector lever to the left lowers the limiting ratio of the variable unit. The further the lever 80 is moved to the left, the lower will be the limiting ratio of the variable unit. The extreme left position of the lever 80 is at the letter FL on the dial 82. When the lever is in this position, the transmission ratio of the system is at the lowest value which can be achieved in the high regime, that is to say at about 0.33 (as shown in FIG. 8).

This action of the ratio limiting valve can occur only when the system is operating in the high regime, at which stage the piston 170 in the cylinder 172 is held at its extreme right position by servo oil in the cylinder. When the system is in its low regime state, as shown in FIG. 2, the cylinder 172 is open to drain pressure, so that movement of the selector 80 to the left would carry with it the piston 170 and would not result in downward movement of the link 176.

POWER TAKE-OFF

Figure 6:
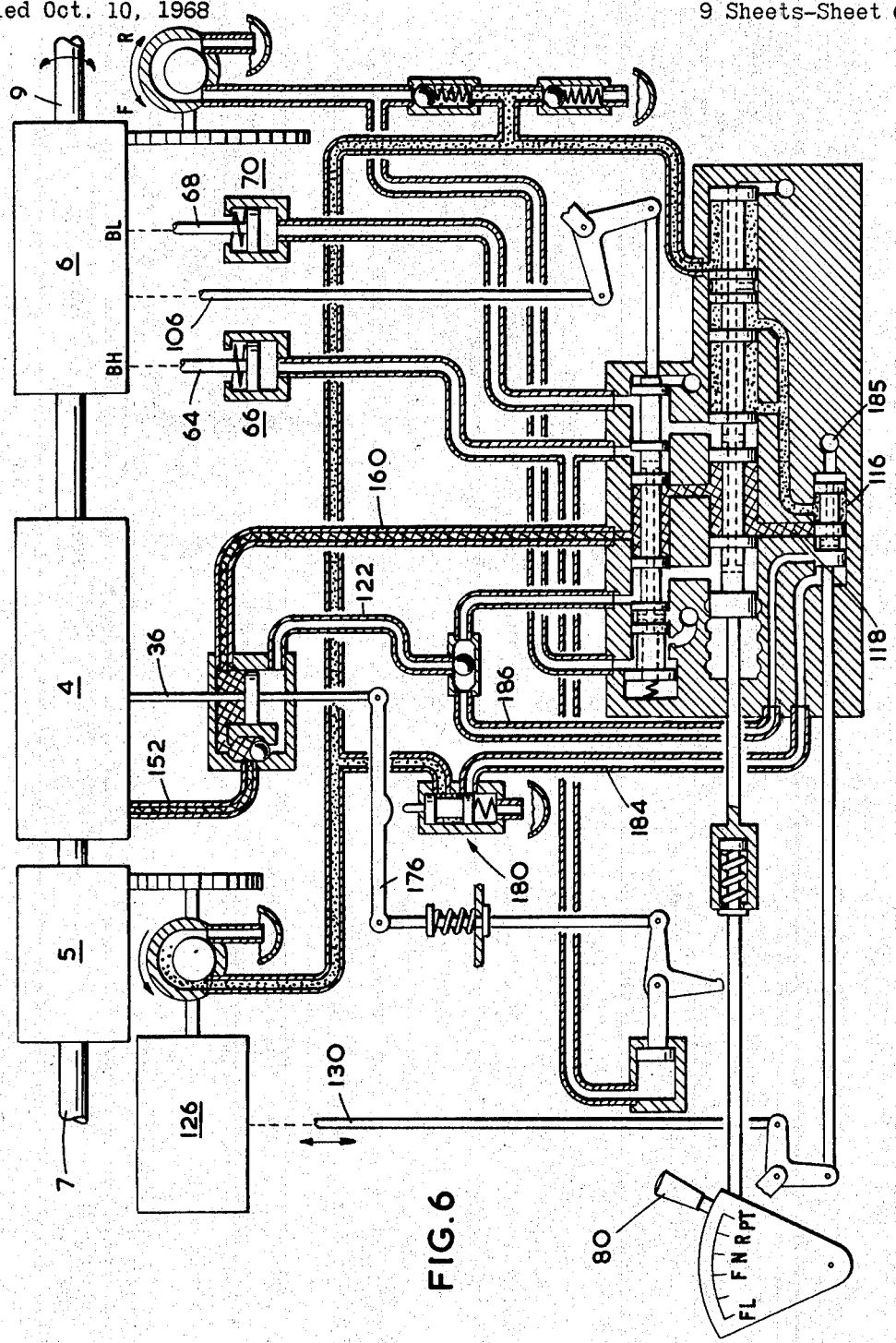
FIG. 6 shows the control system in a state in which a power drive can be obtained to drive auxiliary equipment while the vehicle remains stationary.

FIG. 6 shows how a power take-off can be obtained from the gear 76 (FIG. 1) by moving the selector lever 80 to the right-hand end of the dial adjacent to the letter P. It will be seen that the regime control valve at this stage is in the low regime position. The braking devices 66 and 70 are both disengaged, while the output shaft 9 is locked by means of a brake 208 (FIG. 1) engaging within a drum 210 on the shaft 9. Control oil is directed to the upper end of the ratio jack, as during high regime operation, and the arrangement is generally such that an increase in engine speed producing an increase in the control pressure results in a reduction in the variable unit ratio and in a corresponding increase in the overall ratio of the system.

ALTERNATIVE ARRANGEMENT FOR PROVIDING A CONSTANT TORQUE LOAD ON THE ENGINE

FIG. 9 shows, in the "neutral" position, an alternative hydraulic control circuit which replaces the engine governor control with a form of control providing for a constant-torque load on the engine independently of the engine governor. The circuit in this case includes a passageway 212 communicating with servo oil during both high regime and low regime operation and leading to a passageway 214 (which is the equivalent of the passageway 118 in the previous example) via a nonreturn ball valve 216 and an orifice valve comprising an orifice member 220 which is urged to the right by a spring 222 so as to allow the passageway 214 to communicate with a drain passageway 224 when there is no servo oil pressure in the passageway 212. When servo oil passes through the orifice member 220, it urges this member to the left against the action of the spring 222 so as to cut off the communication with the drain passageway 224, as shown in the drawing.

The regime control valve 226 in this example differs from the valve 98 in the previous example.

Figure 10:
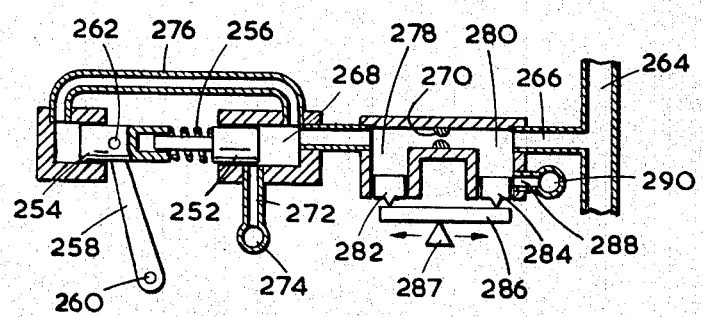
FIG. 10 shows a detail of the circuit shown in FIG. 9

During high regime operation a pipe 228 delivery control oil to the upper end of the ratio jack via a pipe 230, an annular space 232 in a ratio limiting valve 234, and a pipe 236; a double-acting ball valve 238 is held against its right-hand seat. A torque-control valve 240 controls the pressure of oil supplied to the upper end of the ratio jack so as to maintain a constant engine torque. This valve is shown in FIG. 10 and will be described further on. When the limiting ratio is achieved, the valve member 235 of the ratio-limiting valve 234 is displaced by the lever 176, as in the previous example, but in this case the operation of the ratio-limiting valve differs; its effect is to interrupt the communication between the pipe 230 and space 232, and to allow a pipe 241 to communicate with a servo oil pipe 242. Servo oil from the pipe 241 flows past a ball valve 244 and into a pipe 246 leading to the lower end of the ratio jack, so as to stop the downward movement of the ratio jack and instead move the ratio jack piston slightly upwards.

During low regime operation, control oil is supplied to the lower end of the ratio jack from a pipe 248, past the ball valve 244 and via the pipe 246, the ball of the valve 244 being held against its left-hand seat. The control pressure in this case is controlled by a second torque-control valve 250 which is similar to the torque-control valve 240. As before, the ratio limiting valve does not come into operation during low regime forward propulsion of the vehicle but it does serve to limit the ratio change in the upward direction during reverse propulsion, the operation in this case being similar to that in the high regime operation. The supply of control oil during reverse propulsion is via a pipe 251, past the ball valve 238 and through the pipes 230 and 236 to the upper end of the ratio jack; there is in this case no control of torque.

FIG. 10 shows diagrammatically how each of the torque control valves 240 and 250 is arranged. The valve comprises basically a tandem piston assembly formed by pistons 252 and 254 which are urged apart by a spring 256, the piston 252 having a narrow end which slides on a central bore in the piston 254. Movement of the piston assembly is controlled by a lever 258 which is pivotally connected to the piston 254 by a pin 262. The lever 258 is itself mounted on a pivot 260.

The pipe in which the pressure is to be controlled to achieve constant torque is shown as the pipe 264. From this pipe a connecting pipe 266 leads to a blow-off cylinder 268 via a restricted orifice 270. The cylinder 268 contains the piston 252 and has a blow-off port 272 through which oil can escape into a pipe 274 leading to drain. Blow-off is controlled by the right-hand end of the piston 252.

The piston assembly is balanced by virtue of the fact that the oil pressure at opposite ends is the same, communication being achieved by means of a passageway 276. Accordingly no force is imparted to the lever 258 by the oil pressure in the blow-off cylinder 268.

The lever 258 moves in response to movement of the control sleeve 32 of the variable unit (see FIG 1.) Clockwise movement of the lever 258 about its pivot pin 260 corresponds to upward movement of the ratio jack piston 42 in the case of the torque control valve 240 (for high regime operation), but corresponds to downward movement of the torque control valve 250 (for low regime operation). It will be seen that the further the lever 258 moves in a clockwise direction, the higher must be the oil pressure in the blow-off chamber 268 before blow-off into the port 272 occurs. The rate of the spring 256 is carefully chosen so that this arrangement gives rise to a constant-torque load on the engine.

On opposite sides of the orifice 270 in the pipe 266 there are laterally extending pipe sections 278 and 280 serving as cylinders containing pistons 282 and 284 bearing on a lever 286 which is pivoted about an adjustable fulcrum 287. The pipe 280 has a blow-off port 288 leading to drain via a pipe 290. Blow-off is controlled by the piston 284. The oil pressure in the blow-off cylinder 268 depends upon the amount of blow-off through the pipe 280. Accordingly the value of constant torque maintained can be adjusted by varying the position of the fulcrum 287 along the lever 286. Displacing the fulcrum to the right results in an increase in the value of constant torque at which the engine will operate, and vice versa. This enables the operator to reduce the torque demanded from the engine when the engine becomes weaker through wear or for any other reason.

As a further alternative the torque control system of FIG. 1 may be modified by arranging, in effect, that the position of the collar 146 bearing on the governor spring 142 responds directly to the torque of the engine, rather than to the position of the accelerator pedal. For this purpose a measure of the torque output of the engine may be obtained from the center gear member 13 of the planetary step-up gear 5, which would in this case not be rigidly secured against rotation but would be restrained against rotation by an appropriate spring arrangement, so that the member 13 is angularly deflected during use to an extent directly dependent upon the engine torque; the collar would, for example, be connected to a radially extending lever on the gear member 13 so as to move closer to the governor body as the engine torque increases.

The engine of the vehicle may be tow started, that is to say by towing the vehicle, for example if the engine self-starter is out of action. To achieve this, the control lever is placed in the N position, and after the vehicle has been accelerated to a sufficient speed by towing, the lever is moved to the F position, whereupon the engine is driven so as to start. Forward driving then carries on as before.

FIG. 7 shows one of the changeover devices, namely that associated with the brake drum BL, as viewed from the input end of the transmission. As shown by the long arrow 302, the normal direction of rotation of the drum is clockwise. This occurs while the system is in the high regime of operation, the drum BH being locked.

The regime control valve is itself controlled by the link 106, as previously described. As shown in FIG. 7, the link 106 is pivotally connected to a link 300 via a bell-crank 301, the link 300 being connected to a toggle member 304 pivotally mounted on a pin 306. A compression spring 308 is shown urging the lower end of the toggle member against a stop 310. The toggle member remains in this position until it is rotated clockwise past the dead center position (in which the center-line of the spring passes through the pivot 306), whereupon the spring 308 rapidly rotates the toggle member further in a clockwise direction and holds it against a stop 312. A chain-dotted outline shows the toggle member in this alternative position which corresponds to the low-regime position in that the link 106 is then in its upper position.

Movement of the toggle member is achieved as follows. So long as the drum BL is rotating clockwise, nothing happens to the toggle member. However, when the drum BL comes to a stop and then begins its contra-rotation (indicated by the shorter arrow), a pivoted abutment 314 engages the adjacent end of the finger 316 and rotates the finger in a clockwise direction about a pivot pin 318. Movement of the finger is resisted by a strong tension spring 320 which has one end 322 anchored to a stationary frame 324 and has its other end hooked through a hole 325 in a latch 326 which is pivotally connected to the finger by a pin 328. As the finger 316 is carried clockwise by the abutment 314, the latch touches the toggle member, but can ride past the toggle member (to approximately the position shown in chain-dotted outline) because the spring 320 yields to permit it to do so. As soon as the abutment 314 passes the finger 316, thus permitting the finger to return under the action of the spring 320, the spring 320 snaps the finger and latch back to their former position (shown in solid outline); during this return movement the latch rotates the toggle member in a clockwise direction past the toggle dead-center position, and the movement of the toggle member is then completed under the action of the toggle spring 308. As a result the link 300 moves to the left and depressed the link 106 which in turn moves the regime control member to the low-regime position in which the brake is applied to lock the drum BL.

Subsequent movement of the toggle member back to its former position is achieved by means of a second change-over device consisting of a second assembly which is in effect a mirror image of the finger 316, latch 326, spring 320 and abutment 314. This second assembly is axially spaced from the first assembly to enable the second abutment to be secured to the drum BH, while the second finger equivalent to the finger 316 may be pivotally mounted on an extension of the pin 318. The toggle member is naturally of sufficient thickness to lie in the paths of both latches.

It should be noted that the abutment 314 is pivoted to the drum BL by a pin 330. Pivotal movement is limited in both directions by a pin 332 on the drum which passes through a curved slot 334 in the abutment. This allows the abutment to swing in a clockwise direction under the action of centrifugal force acting on the heavier end of the abutment (i.e., the end extending further from the pivot pin 330). This swinging carries inwards a raised portion of the abutment. It is this raised portion that is capable of engaging the finger 316; the remainder of the abutment is arranged to miss the finger. Accordingly, when the drum BL is rotating at some speed, this arrangement keeps the raised portion 336 out of the way so as not to click over the end of the finger at each revolution. As the drum BL slows down to a stop (on approaching the regime change point), the abutment is returned to its normal position (shown in solid outline) by a light tension spring 337 so as to be ready to engage the finger when it begins its contra-rotation. While the drum is rotating slowly in a clockwise direction, the abutment clicks pass the finger, being moved inwards by the finger through a cam action.

In the above description, only one abutment 314 has been mentioned. In practice there may be two or more similar abutments evenly spaced around the drum to reduce the maximum possible angle of contra-rotation which can occur before the toggle is operated.

I claim:
1. A variable speed transmission system comprising a variable ratio transmission unit of which the drive ratio is steplessly variable, a transmission input member driving said variable ratio transmission unit, a transmission output member and a planetary gear train, said transmission output member being driven by said variable ratio transmission unit via said planetary gear train characterized in that there is further provided two rotary parts of the planetary gear train which normally rotate in opposite directions, two brakes and two regime change-over devices, each of said brakes and each of said regime change-over devices being associated with one of said rotary parts, a regime control member which is connected to the said regime change-over devices and which is operable thereby between a first and a second position, means for actuating said brakes alternately so as to lock said rotary parts alternately to provide two regimes of operation of said transmission system, a fluid pressure-actuated means for varying the drive ratio of said variable ratio transmission unit, first and second fluid inlet ports in said regime control member, first and second fluid outlet ports associated with said first fluid inlet port, said first fluid inlet port communicating with said fluid pressure-actuated means via said first fluid outlet port to provide one mode of operation of said fluid pressure-actuated means when said regime control member is in said first position and communicating with said fluid pressure-actuated means via said second fluid outlet port to provide a reversed mode of operation of said fluid pressure-actuated means when said regime control member is in said second position, and third and fourth fluid outlet ports associated with said second fluid inlet port, said second fluid inlet port communicating with said third fluid outlet port when said regime control member is in said first position and communicating with said fourth fluid outlet port when said regime control member is in said second position such that fluid flowing through said third and fourth fluid outlet ports is arranged to actuate the two brakes respectively, each of said rotary parts being adapted, when rotating in a direction contra to its normal direction of operation to engage the associated regime change-over device which in turn actuates said regime control member to lock the brake associated with that rotary part which is undergoing contra rotation and to unlock the brake associated with the other rotary part, each rotary part being arranged so that as the system approaches the change-over point between the two regimes, the rotary part then rotating in its normal direction of rotation will slow down and then commence to rotate in the contra direction.

2. A transmission system according to claim 1, for use as a vehicle transmission, in which the first regime of operation, which is the low regime for the vehicle, includes a zero output speed which occurs at an intermediate setting of the variable unit ratio, so that changes from this ratio in one direction provides a low-gear forward drive, while changes in the other direction provide a reverse drive for the vehicle.

3. A transmission system according to claim 2 in which the variable unit is a frictional roller drive gear comprising a plurality of rollers and at least two torus discs wherein said rollers drive frictionally between said torus discs.

4. A transmission system according to claim 3, in which there is provided a control sleeve which controls the ratio angle of said rollers, said control sleeve being itself controlled by said fluid pressure-actuated means for which the pressure is varied in response to the engine speed and in response to the vehicle accelerator setting or engine torque, so that the variable unit tends to increase with output speed of the system as the engine speed increases, but on the other hand tends to decrease the output speed, that is to say produce a lower over-all transmission ratio, in response to an increase in the engine torque or in the fuel supply to the engine as determined by the accelerator setting.

5. A transmission system according to claim 4 in which there is further provided a constant torque valve system and a blow-off arrangement which limit the pressure of fluid applied to said fluid pressure-actuated means in response to the position of said control sleeve.

References Cited
UNITED STATES PATENTS

| | | | |
|---|---|---|---|
| 1,415,164 | 5/1922 | Ford | 74—690 |
| 1,985,110 | 12/1934 | Sharpe | 74—690X |
| 2,164,504 | 7/1939 | Dodge | 74—690 |
| 2,216,190 | 10/1940 | Erban | 74—690 |
| 3,277,745 | 10/1966 | Harned et al. | 74—691 |
| 3,406,597 | 10/1968 | Perry et al. | 74—691X |

ARTHUR T. McKEON, Primary Examiner

U.S. Cl. X.R.

74—865